United States Patent [19]

Jacobson

[11] 3,995,314

[45] Nov. 30, 1976

[54] PEDAL OPERATED TRANSCRIPTION ADAPTOR FOR A MINIATURE TAPE RECORDER

[76] Inventor: Sava Jacobson, 8130 Orion St., Van Nuys, Calif. 91406

[22] Filed: July 17, 1975

[21] Appl. No.: 596,912

[52] U.S. Cl. .................................. 360/74; 360/137
[51] Int. Cl.² .................... G11B 15/48; G11B 15/50
[58] Field of Search ............ 179/100, 1 DR; 360/74, 360/137, 13

[56] References Cited
UNITED STATES PATENTS

| | | |
|---|---|---|
| 3,207,847 | 9/1965 | Epstein .................... 179/100.1 DR |
| 3,238,307 | 3/1966 | Peck ......................... 179/100.1 DR |
| 3,839,600 | 10/1974 | Matz ......................... 179/100.1 DR |

Primary Examiner—Jay P. Lucas
Attorney, Agent, or Firm—Howard A. Silber

[57] ABSTRACT

A transcription adaptor for a miniature tape recorder provides foot-operated selection of playback or rewind, and permits adjustment of the playback volume at the earphones. The adaptor includes a housing which holds the recorder, and a foot pedal assembly having a foot pedal and means for operatively, releaseably connecting the pedal to the forward/reverse switch of the recorder. The recorder has an automatic level control circuit for playback which cooperates with a volume control attached to the earphones.

12 Claims, 16 Drawing Figures

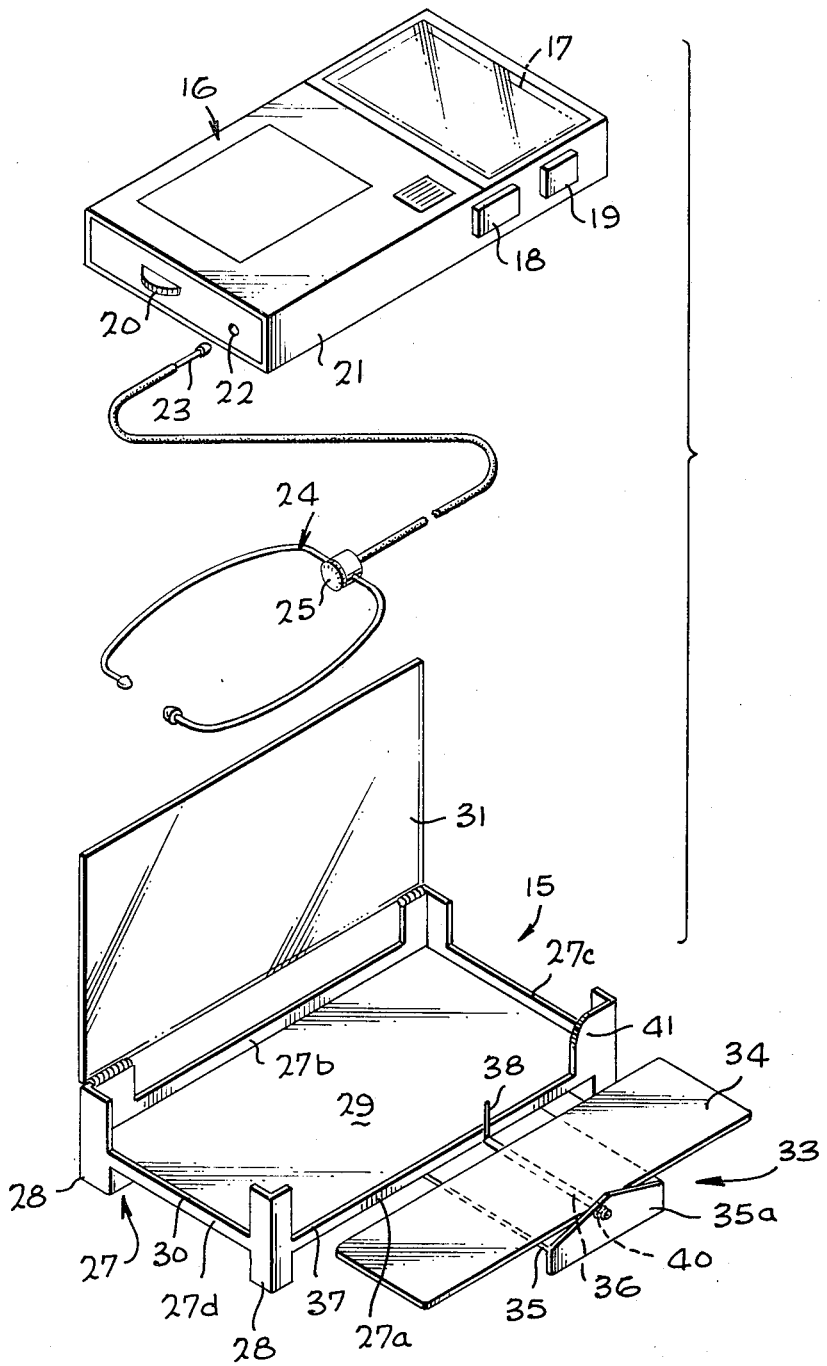
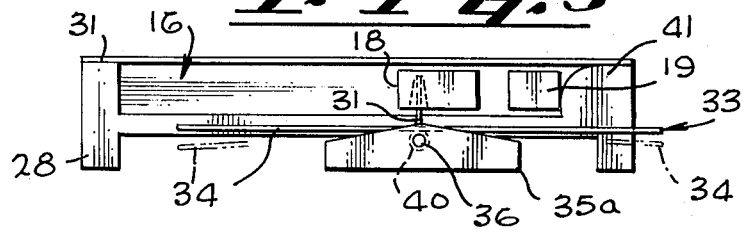

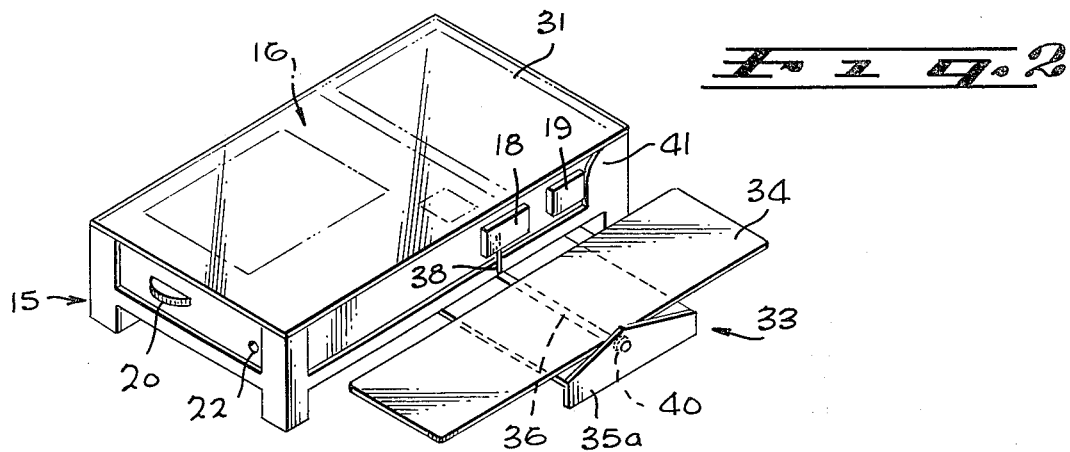
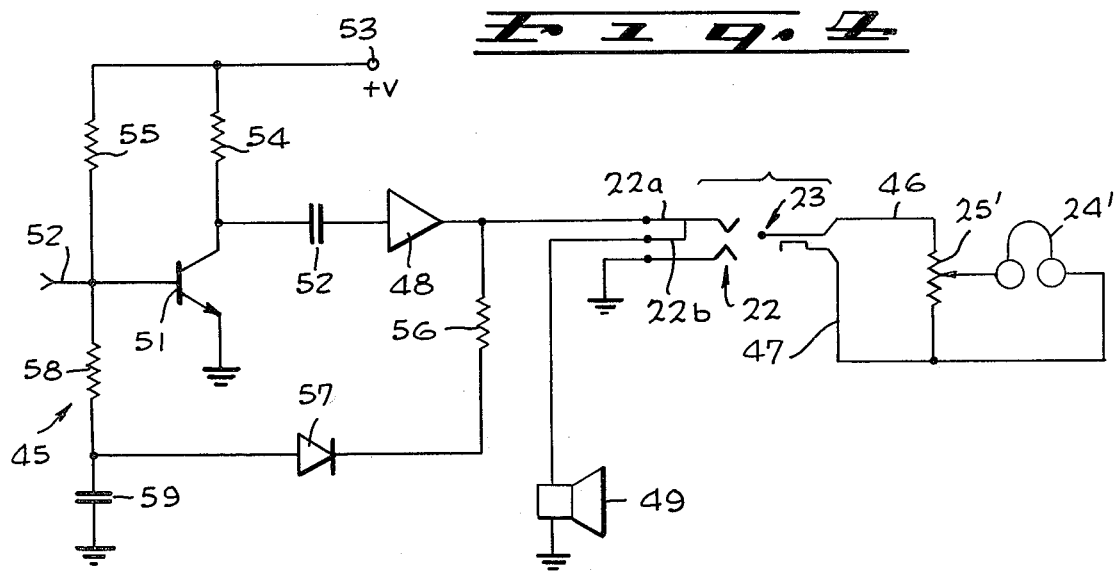
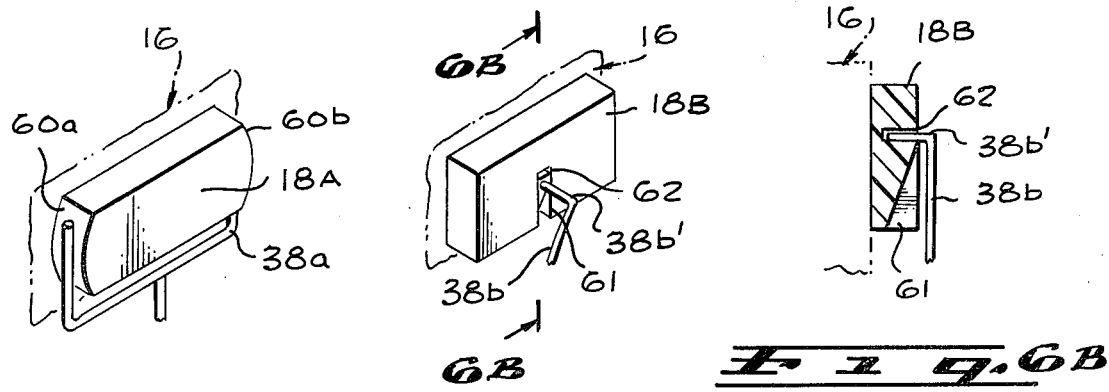

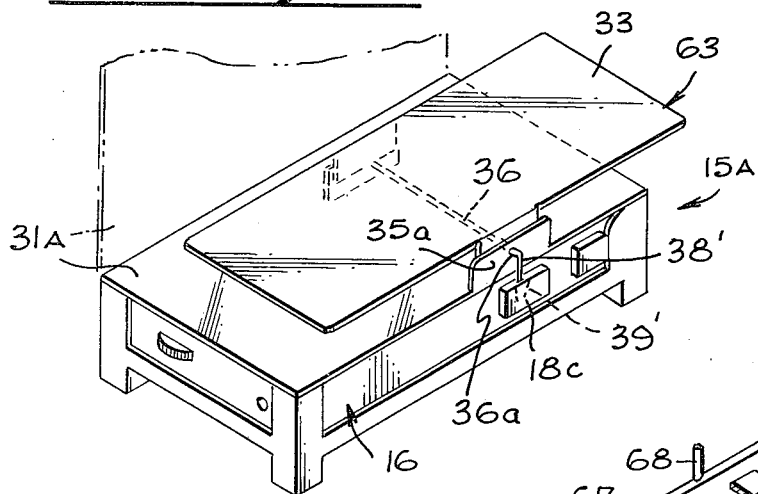
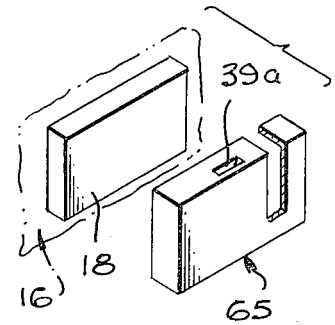
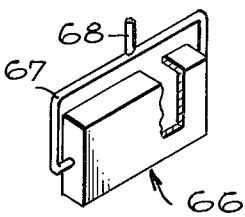
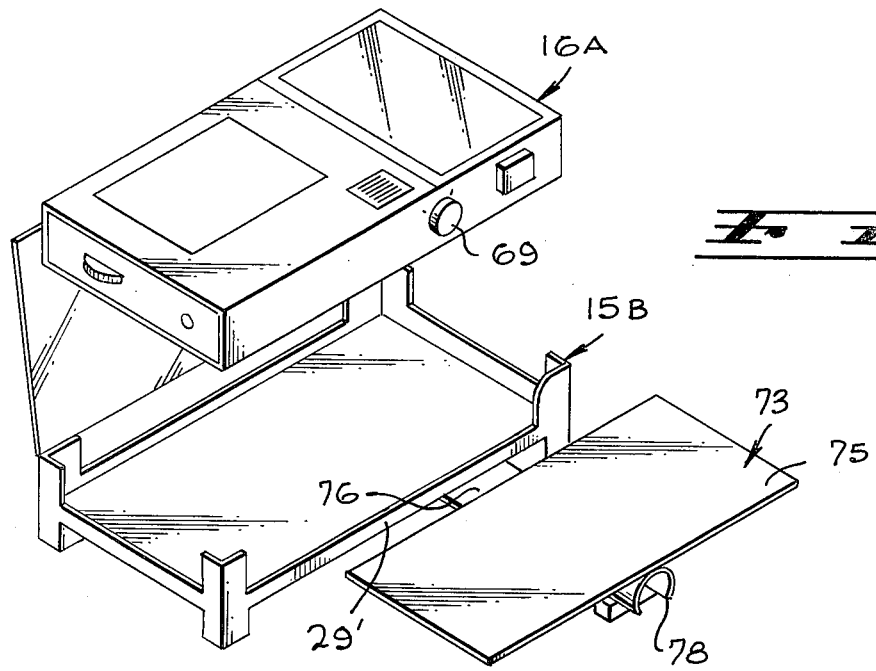
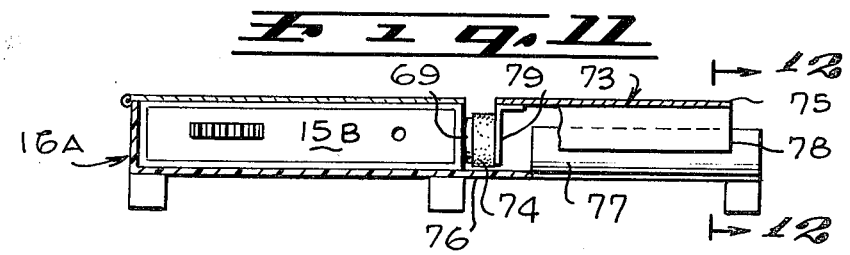

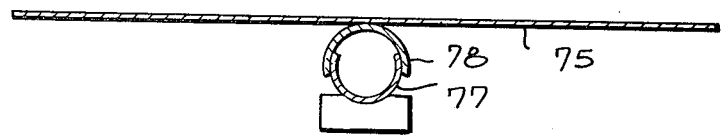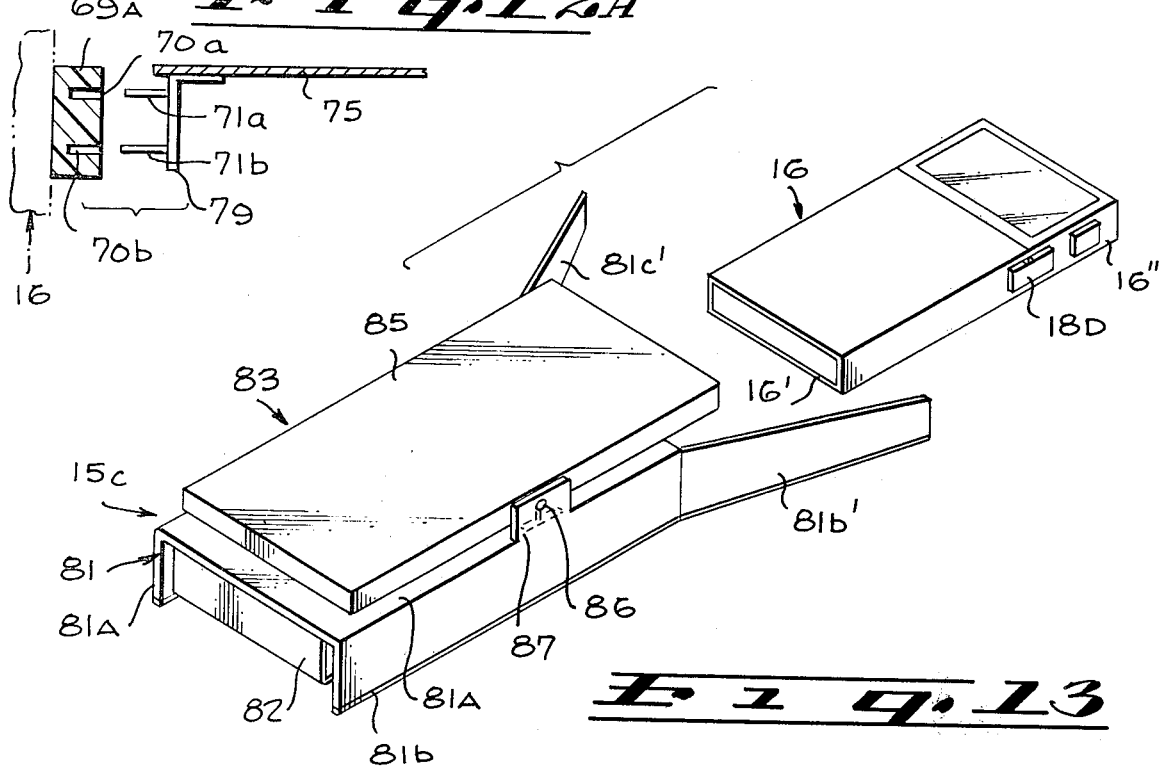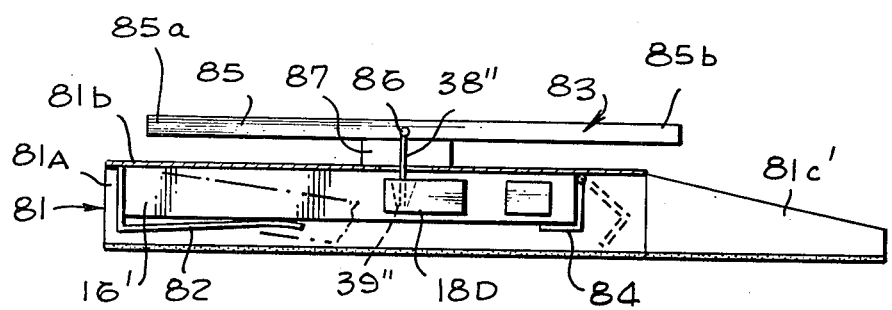

PEDAL OPERATED TRANSCRIPTION ADAPTOR FOR A MINIATURE TAPE RECORDER

BACKGROUND OF THE INVENTION

1. Field of the Invention

The present invention relates to a transcription adaptor for a miniature portable tape recorder.

2. Description of the Prior Art

Very compact portable tape recorders have become popular for on-the-spot dictation of notes and correspondence. Typically a business man will carry such a pocket-sized recorder with miniature tape cassettes when he is away from the office. When he returns, the cassettes are available for transcription using a separate transcribing machine.

The use of a separate transcriber is necessitated because, while the portable recorder itself has a playback capability, it is not configured for foot pedal control. This function is provided by the transcribing machine, which is provided with a foot pedal that ordinarily has two operative positions. When the typist depresses the foot pedal to the playback position, the message on the tape is amplified and provided to the typist via earphones. If the typist misses a word or a sentence, she can depress the foot pedal to the rewind position. A short section of the tape is rewound rapidly for replay when the playback pedal again is depressed. Use of such a foot pedal control facilitates rapid, accurate transcription.

Up to now, the purchase of a separate transcribing machine was required to obtain the foot pedal control facilities necessary for transcription. The transcriber may cost as much as, if not more than, the recorder itself. An object of the present invention is to provide a transcription adaptor which facilitates foot pedal control of the recorder itself, thereby enabling the recorder to be used for transcription purposes. Another object of the invention is to provide a transcription adaptor into which the portable recorder is inserted, and which facilitates foot pedal playback control and earphone reproduction of the recorded material at a volume conveniently selectable by the typist.

SUMMARY OF THE INVENTION

These and other objectives are achieved by providing a transcription adaptor that has a housing which receives the miniature tape recorder, and a foot pedal assembly attached to the housing. This assembly includes a foot pedal and means for operatively, releaseably connecting the pedal to the forward/reverse switch of the recorder. In addition, the transcription adaptor includes a set of earphones which plug into the recorder and contain a volume control on the earphone yoke. When operated in conjunction with an automatic level control circuit in the recorder, this arrangement permits the typist to adjust the playback volume without reaching down to change the setting of the volume control in the recorder which is now held in the transcription adaptor at floor level.

Alternative foot pedal assemblies are disclosed. Typically these include a foot pedal that pivots about a central shaft. Connected to the shaft is a member that engages the forward/reverse switch of the recorder. This may comprise a flexible rod that projects into a bore in the forward/reverse switch, a yoke that slides over the switch, a resilient cap that engages the switch, or other variants. Provision is made for releaseably engaging the forward/rewind switch so that the recorder readily may be inserted and removed from the transcription adaptor housing.

BRIEF DESCRIPTION OF THE DRAWINGS

A detailed description of the invention will be made with reference to the accompanying drawings wherein like numerals designate corresponding elements in the several figures.

FIG. 1 is a pictorial view of a cassette recorder and of a transcription adaptor in accordance with the present invention.

FIG. 2 is a pictorial view showing the recorder operatively installed within the transcription adaptor of FIG. 1.

FIG. 3 is a front view of the transcription adaptor and recorder also shown in FIG. 2.

FIG. 4 is an electrical schematic diagram of an automatic level control circuit useful in the recorder of FIG. 1.

FIGS. 5 and 6A are fragmentary pictorial views showing alternative means for connecting a foot pedal to the forward/reverse switch of the recorder in FIG. 1.

FIG. 6B is a transverse sectional view along the line 6B—6B of FIG. 6A.

FIG. 7 is a pictorial view of another embodiment of the inventive transcription adaptor.

FIGS. 8 and 9 show modified means for connecting the transcription adaptor of FIG. 7 to the forward-/reverse switch of a recorder.

FIG. 10 is a pictorial view of another recorder and associated transcription adaptor.

FIG. 11 is a side view, partly broken away and in section, of the transcription adaptor of FIG. 10.

FIG. 12 is a transverse sectional view of the adaptor of FIG. 11, as viewed along the line 12—12 thereof.

FIG. 12A is a fragmentary pictorial view showing another means for attaching a foot pedal to the forward/reverse switch of a recorder.

FIGS. 13 and 14 respectively are pictorial and side views of yet another transcription adaptor in accordance with the present invention.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

In the embodiment of FIGS. 1, 2 and 3, the transcription adaptor 15 advantageously is employed with a pocket-sized recorder 16 that uses a conventional miniature tape cassette 17. The recorder 16 is battery operated, and includes three principal controls, a forward/reverse switch 18, a record/playback switch 19, and a volume control 20. These, together with the conventional tape drive mechanism and electrical circuitry are contained in a case 21 having typical dimensions of about 5 inches in length, 3 inches in width, and 1 inch in height.

The switch 18 is slidable longitudinally of the case 21. When moved to the right as viewed in FIG. 1, the cassette 17 is driven forward. When the switch 18 is moved to the left, the cassette 17 is driven in the reverse or rewind direction. With the switch 18 in the central or neutral position, the cassette 17 is stopped. The record/playback switch 19 also moves longitudinally of the case 21 between a record position (right) and a playback position (left). A linkage (not shown) may be provided to return the switch 19 to the playback position each time the switch 18 is set to rewind. For use during transcription, the recorder 16 is provided with an earphone jack 22 that receives the plug 23 of a set of earphones 24. In accordance with the present invention, the recorder 16 is provided with an automatic level control for playback, that cooperates with a volume control 25 situated on the yoke of the earphones 24. This permits the typist conveniently to adjust the playback volume without reaching down to the floor to change the control 20.

The transcription adaptor 15 includes a housing 27 with feet 28 that sit on the floor. The housing 27 includes a front wall 27a, a rear wall 27b, end walls 27c, 27d and a base 29. These may be fabricated of molded plastic or other material. The walls 27a – 27d are dimensioned to receive the recorder 16 as shown in FIG. 2. The end 27d is generally U-shaped so as to provide an opening 30 through which the volume control 20 and earphone jack 22 are exposed. The adaptor 15 has a hinged lid 31 which closes over the recorder 16 as shown in FIG. 2. The lid 31 may be spring loaded to return to the open position (FIG. 1) when a latch (not shown) is released.

Extending forward of the front wall 27a is a foot pedal assembly 33. This includes a foot pedal 34 that is pivotally mounted on a support 35 which itself may rest on the floor. The pedal 34 is attached to a shaft 36 that is journaled to an upwardly extending front lip 35a of the support 35. The shaft 36 also is journaled to the front wall 27a of the housing 27. Thus the shaft 36, which may be formed integrally with the pedal 34, functions as the pivotal axis for the pedal 34.

When the recorder 16 is placed in the housing 27 as shown in FIG. 2, the forward/reverse switch 18 projects forwardly through an opening 37 in the front wall 27a. The foot pedal assembly 33 includes a vertical rod 38 attached to the foot pedal shaft 36. As the recorder 16 is inserted in the housing 27, the rod 38 is matingly received in a bore 39 extending upwardly from the bottom of the forward/reverse switch 18. As best shown in FIG. 3, this bore 39 is tapered at the bottom so as to provide clearance for the pin 38 as it pivots back and forth during pedal operation.

The foot pedal assembly 33 is situated so that when the switch 18 is in the neutral position, the bore 39 will be directly above the shaft 36 so that the rod 38 is in the vertical position. This is illustrated in solid in FIG. 3.

When the typist steps down on the right side of the foot pedal 34, the shaft 36 and the rod 38 pivot clockwise so as to slide the switch 18 to the right, into the forward position. In this mode, the cassette 17 is played back via the earphones 24. Playback will continue for as long as the right side of the foot pedal 34 is depressed. When the typist removes her foot from the pedal 34, a spring 40 returns the foot pedal to the neutral position. The force of the spring 40, exerted via the shaft 36 on the rod 38, is sufficient to return the forward/reverse switch 18 to the neutral position.

For rewind, the typist steps on the left side of the foot pedal 34. This causes the shaft 36 and the rod 38 to pivot counterclockwise, thereby moving the switch 18 to the left, into the reverse position. The cassette 17 rewinds for as long as the foot pedal 34 remains so depressed. When the pedal 34 is released, the spring 40 again returns the switch 18 to the neutral position. The rod 38 advantageously is somewhat flexible, so that excessive depression of the foot pedal 34 will not force the switch 18 beyond its limits, as might be the case if the rod 38 were very stiff.

It is necessary that the recorder 16 be in the playback mode during transcription. To insure this, the front wall 27a of the housing 27 is provided with a rigid, vertical projection 41 having an arcuate left side. If the switch 19 is in the playback position, the recorder 16 can be freely inserted into the adaptor 15. However if the switch 19 initially is in the record position, it will come in contact with the arcuate side of the projection 41 during insertion. As the switch 19 "slides down" the projection 41 it will be urged to the left, into the playback position.

As noted above, the typist can change the playback volume using the earphone-mounted volume control 25, without having to reach down to floor level to adjust the volume control 20 in the recorder 16. By employing an automatic level control (ALC) circuit for playback, the volume control 25 can be implemented without extra wires in the cable to the earphones 24, and without the introduction of distortion on playback of messages having different recording levels.

The use of an ALC circuit for playback is particularly important where several messages are recorded on the cassette 17 at different volume levels. In the absence of an ALC circuit, if the recorder volume control 20 were set for a comfortable level to play back a message recorded at the low level, when a message recorded at high level subsequently was played back, the amplifier would saturate or start clipping, thereby causing distortion. Adjustment of a potentiometer volume control wired to the amplifier output would lower the earphone volume level, but would not eliminate the distortion, since an excessive signal still is being supplied into the amplifier. The typist would have to reach down to the recorder 16 to lower the volume control 20.

This problem could be overcome by wiring an earphone-mounted volume control to the amplifier input circuit. However that would necessitate the use of extra wires in the cable to the earphone. The cable would have two wires to the earphone, plus additional wires from the potentiometer to the input circuit.

In accordance with the present invention, both problems are overcome by using an automatic level control circuit, such as the exemplary circuit 45 of FIG. 4, for playback. The earphone mounted volume control 25 then may simply comprise a potentiometer 25' (FIG. 4) wired across the earphone 24' leads 46 and 47. No extra wires are required.

The recorder volume control 20 may be set for comfortable volume during playback of a message of low or medium volume level. If a subsequent message has been recorded at high level, the ALC circuit will prevent saturation and clipping in the output amplifier. The typist will hear the new message at a comfortable volume, free from distortion. The volume can be adjusted effectively using the potentiometer 25' mounted on the earphone yoke.

Referring to FIG. 4, the ALC circuit 45 includes an amplifier 48 that normally drives a loudspeaker 49 mounted within the recorder case 21. Connection to the speaker 49 is via the normally closed contacts 22a and 22b of the headphone jack 22. When the earphone plug 23 is inserted into the jack 22, the contacts 22a, 22b open so as to disconnect the loudspeaker 49. The output of the amplifier 48 then is fed to the earphones 24' via the potentiometer 25' that constitutes the volume control 25. Automatic level control is provided by automatically adjusting the gain of an amplifier input stage including a transistor 51. The audio signal obtained from the cassette tape 17 is supplied to the base of the transistor 51 via a pickup head and an optional preamplifier (not shown) and an input line 52. The collector output of the transistor 51 is supplied to the amplifier 48 via a capacitor 52. Collector voltage is supplied from a source 53 of positive voltage via a resistor 54. Some forward bias is supplied to the base of the transistor 51 via a resistor 55 also connected to the voltage source 53.

Automatic level control is achieved through the use of negative feedback from the amplifier 48 output back to the base of the input transistor 51. This is implemented by a resistor 56 connected in series with a diode 57 and with another resistor 58 between the amplifier 48 output and the base of the transistor 51. A portion of the amplifier output 47 thus is rectified by the diode 57 to provide a dc feedback voltage across a capacitor 59. This voltage is combined with the fixed base bias supplied via the resistor 55, and is of opposite polarity.

Thus the bias, and hence the gain, of the input transistor 51 is determined by the output level from the amplifier 48. When a high level message is played back from the cassette 17, the amplifier 48 output initially will be high. This will increase the dc feedback signal developed via the diode 57 across the capacitor 59. This feeback signal cancels out part of the forward bias provided via the resistor 55, thereby reducing the bias and gain of the transistor 51. As a result, the amplifier 48 output level is reduced commensurately. Automatic level control is achieved.

Many variations in the adaptor configuration are possible. Some of these are shown in FIGS. 5 through 14. For example, FIGS. 5, 6A 6B show alternative means for coupling the foot pedal assembly 33 to the forward/reverse switch 18. In FIG. 5, the rod 38 is replaced with a yoke 38a that engages the sides 60a, 60b of the forward/reverse switch 18. Optionally, the sides 60a, 60b may be provided with grooves (not shown) to receive the arms of the yoke 38a.

In the embodiment of FIGS. 6A and 6B, the rod 38 is replaced with a flexible bar 38b of inverted-L-shaped configuration. As the recorder 16 is inserted, the rearwardly projecting arm 38b' of the rod 38b is flexed outward by the inclined surface of a groove 61 in the front of the forward/reverse switch 18. When the recorder 16 is in place, the arm 38b' snaps into a receiving hole 62 in the switch 18.

In the transcription adaptor 15A of FIG. 7, the foot pedal assembly 63 is mounted atop the lid 31A. As in the embodiment of FIG. 1, the foot pedal 33 pivots about a shaft 36 which in this embodiment has an extension 36a that projects forwardly from the front face 35a of the pedal support 35. A flexible rod 38' depends downwardly from the shaft extension 36a into a tapered hole 39' in the forward/reverse switch 18C. Operation of the foot pedal assembly 63 is the same as that described above for the corresponding assembly 33.

The transcription adaptor 15A may be used with a recorder having a forward/reverse switch 18 that does not have a tapered bore 39', through the use of an adaptor cap 65 shown in FIG. 8. The cap 65 may be made of plastic molded in a shape adapted to fit over the recorder forward/reverse switch 18. The adaptor 65 itself contains a tapered hole 39a which receives the flexible rod 38'.

An alternative adaptor cap 66 is shown in FIG. 9. The cap 66 likewise is configured to fit over the forward-/reverse switch 18. It includes an integral yoke 67 having a flexible shaft 68 which replaces the rod 38' and is attached to the foot pedal shaft extension 36a. Similar adaptors could be used in conjuction with the transcription adaptor 15 of FIG. 1.

In the embodiment of FIGS. 10, 11 and 12, the recorder 16A has a rotary forward/reverse switch 69. The transcription adaptor 15B is provided with a foot pedal assembly 73 that has a resilient, cylindrical cap 74 which slides onto the forward/reverse switch 69 and is rotated by a foot pedal 75.

The assembly 73 has a support 76 at the front of the adaptor base 29'. Attached to the support 76 is a partly cylindrical member 77. At the bottom of the foot pedal 75 is a member 78 of C-shaped cross-section which snaps onto the member 77. With this arrangement, the foot pedal 75 and the member 78 together can pivot or rotate about the member 77. Also attached to the pedal 75 is a depending bracket 79 to which the flexible cap 74 is attached.

The pedal 75, the member 78, the bracket 79 and the clamp 74 comprise a unit that can be moved forward and backward, axially of the support member 77. Thus as the recorder 16A is placed into the adaptor 15B, the foot pedal 75 and cap 74 are pulled back out of the way as illustrated in FIG. 10. When the recorder 16A is in place, the foot pedal 75 is pushed forward so that the cap 74 engages the forward/reverse switch 69 as shown in FIG. 11. This is the operative position in which switch 69 can be rotated between the forward and reverse positions by respectively depressing the right and left sides of the foot pedal 75.

In the alternative embodiment of FIG. 12A, the forward/reverse switch 69A has a pair of holes 70a, 70b which receive a pair of pins 71a, 71b that project from the front of the bracket 79. In other words, the pins 71a, 71b serve in place of the resilient cup 74 in the embodiment of FIGS. 10 – 12.

Yet another embodiment is shown in FIG. 13. Here the transcription adaptor 15C has a housing 81 of generally inverted-U-shape including a top 81a and depending sides 81b and 81c. The housing 81 may be open at the front and rear, and a portion 81b', 81c' of each side may be angled outward at the forward end of the housing to add stability.

As shown in FIG. 14, the recorder 16 is inserted from the bottom by first engaging the rear end 16' beneath a flexible metal clip 82. When so inserted, there will be a clearance between the top of the forward/reverse switch 18D and a flexible rod 38" that depends from the foot pedal assembly 83. The front 16" of the recorder then is pivoted upwardly into the position shown in solid in FIG. 14, where it is held by an L-shaped clip 84 that is hinged to the housing top 81a. The clip 84 swings out of the way (as shown in phantom) during insertion of the recorder 16.

The assembly 83 includes a foot pedal 85 that is pivotally mounted via a shaft 86 to a generally U-shaped support bracket 87 which is attached to the cover 81a of the housing 81. The flexible rod 38" depends downwardly from the shaft 86 and engages a tapered hole 39" in the forward/reverse switch 18D. A spring (not shown) may be provided to return the foot pedal 85 to the neutral position. When the pedal end 85a is depressed, the recorder 16 goes into the forward, playback mode. When the pedal end 85b is depressed, the cassette 17 is rewound.

I claim as my invention:

1. A system for using the same miniature portable tape recorder for both recording and transcription, comprising;
    a miniature portable tape recorder having record and playback capabilities, said recorder also having;
        a forward/reverse switch for changing the direction of travel of tape in said recorder, said switch having a neutral position in which said tape does not move,
        an amplifier for amplifying messages picked up from said tape during playback,
        an automatic level control circuit operatively connected to said amplifier for automatically controlling the volume level during playback,
        an earphone jack connected to the playback output of said automatic level controlled amplifier,
    a set of earphones, and wires connecting said earphone to a plug adapted for insertion into said jack,
    a potentiometer volume control operatively connected to said earphone wires and mounted in proximity to said earphones, and
    a transcription adaptor, comprising:
        a housing configured to rest on the floor and to receive said recorder,
        a foot pedal assembly mounted to said housing, including;
            a foot pedal moveable by foot depression between a neutral and two other positions, and
            means connected to said foot pedal for operatively, releaseable engaging said forward/rewind switch when said recorder is within said housing, and configured so that said switch will be moved to said forward and rewind positions respectively when said pedal is depressed to one or the other of its two positions.

2. A system according to claim 1 wherein said recorder further includes a record/playback switch for changing the operational mode of said recorder from record to playback, and wherein said transcription adaptor further includes means for conditioning said record/playback switch to the playback position when said recorder is received in said housing.

3. A system according to claim 2 wherein said record/playback switch moves lengthwise of the recorder case, and wherein said means for conditioning comprises a projection on said housing positioned to prevent said recorder from being received in said housing with said record/playback switch in the record position, said projection having an accurate portion that urges said record/playback switch to the playback position during insertion of said recorder into said housing.

4. A system according to claim 1 wherein said earphones are attached to a yoke, said potentiometer volume control being mounted on the yoke of said earphones.

5. A system according to claim 1 wherein said foot pedal is pivotally mounted and includes a spring for returning said pedal to the neutral position, and wherein said means for engaging comprises a flexible rod attached to said pedal and situated to be matingly received in a bore in the forward/reverse switch of said recorder.

6. A system according to claim 1 wherein said foot pedal is pivotally mounted and includes bias means for returning said pedal to the neutral position, wherein said forward/reverse switch slides longitudinally of said recorder case, and wherein said means for engaging comprises a yoke-configured member adapted to engage at least a portion of the sides of said slideable forward/reverse switch.

7. A system according to claim 1 wherein said forward/rewind switch is rotary, and wherein said foot pedal is mounted for limited rotation about an axis that is aligned with the axis of rotation of said forward/rewind switch when said recorder is received in said housing, and wherein said means for engaging comprises a member attached for limited rotation with said foot pedal and for linear movement along said axis between a disengaged position in which said recorder can be inserted into said housing and an engaged position in which said member engages said forward/reverse switch.

8. A transcription adapter for use with a miniature portable tape recorder having a forward/rewind switch, comprising;
    a housing adapted for removably holding said recorder,
    a foot pedal assembly mounted on said housing and having;
        a foot pedal mounted to be moved from a neutral position to first and second alternate operative positions upon selective depression of said pedal, and
    means for operatively, releasably connecting said foot pedal to the forward/rewind switch of said recorder when said recorder is held by said housing, whereby selective depression of said foot pedal to said first or second position will move said switch to the respective forward or rewind position.

9. A transcription adapter according to claim 8 wherein said recorder has an automatic level control circuit operatively associated with the playback amplifier, a set of earphones adapted to be connected to said recorder to receive the output of said automatic level controlled amplifier during playback, and a potentiometer volume control mounted on said set of earphones and wired across the earphone leads.

10. A transcription adapter according to claim 9 wherein said means for connecting includes an adapter member, operatively attached to said foot pedal, for insertingly or overlappingly engaging said forward/rewind switch.

11. A transcription adaptor according to claim 10 wherein said recorder forward/reverse switch is slideable lengthwise of the recorder case, said switch having a tapered bore therein, and wherein said adaptor member comprises a flexible rod that projects into said bore when said recorder is held by said adaptor, said rod being pivoted as said foot pedal is moved to each operative position, the taper of said bore providing sufficient clearance for said rod as the end region of said rod imparts sliding movement to said forward/reverse switch.

12. A transcription adaptor according to claim 8 wherein said recorder has an automatic level control circuit operatively associated with the playback amplifier.

* * * * *